United States Patent [19]

Müller

[11] Patent Number: 5,667,692

[45] Date of Patent: Sep. 16, 1997

[54] METHOD AND SUPPORTS FOR GEL PERMEATION CHROMATOGRAPHY

[75] Inventor: Egbert Müller, Erzhausen, Germany

[73] Assignee: Merck Patent Gesellschaft mit beschrankter Haftung, Darmstadt, Germany

[21] Appl. No.: 624,476

[22] PCT Filed: Sep. 24, 1994

[86] PCT No.: PCT/EP94/03197

§ 371 Date: Jul. 16, 1996

§ 102(e) Date: Jul. 16, 1996

[87] PCT Pub. No.: WO95/10355

PCT Pub. Date: Apr. 20, 1995

[30] Foreign Application Priority Data

Oct. 8, 1993 [DE] Germany ............................ 43 34 353.8

[51] Int. Cl.$^6$ ............................................ B01D 15/08
[52] U.S. Cl. ..................... 210/635; 210/656; 210/198.2; 210/502.1
[58] Field of Search ............................... 210/635, 656, 210/198.2, 502.1; 502/401, 402, 404, 439

[56] References Cited

U.S. PATENT DOCUMENTS

| | | | |
|---|---|---|---|
| 3,663,263 | 5/1972 | Bodre | 210/198.2 |
| 3,808,125 | 4/1974 | Good | 210/198.2 |
| 4,029,583 | 6/1977 | Ho Chang | 210/198.2 |
| 4,045,353 | 8/1977 | Kosaka | 55/386 |
| 4,140,653 | 2/1979 | Imura | 210/198.2 |
| 4,202,775 | 5/1980 | Abe | 210/287 |
| 4,246,351 | 1/1981 | Miyake | 210/692 |
| 4,324,689 | 4/1982 | Shah | 210/198.2 |
| 4,330,440 | 5/1982 | Ayers | 210/198.2 |
| 4,332,694 | 6/1982 | Kalal | 435/180 |
| 4,335,226 | 6/1982 | Muller | 210/656 |
| 4,352,884 | 10/1982 | Nakashima | 210/198.2 |
| 4,406,870 | 9/1983 | Miyake | 210/681 |
| 4,415,631 | 11/1983 | Schutijser | 210/198.2 |
| 4,551,245 | 11/1985 | Ramsden | 210/198.2 |
| 4,710,525 | 12/1987 | Kraemer | 523/201 |
| 4,737,533 | 4/1988 | Charmot | 264/311.11 |
| 4,756,834 | 7/1988 | Muller | 210/635 |
| 4,767,529 | 8/1988 | Boos | 210/198.2 |
| 4,829,101 | 5/1989 | Kraemer | 523/201 |
| 4,882,048 | 11/1989 | Blaschke | 210/198.2 |
| 4,882,226 | 11/1989 | Schutyser | 210/198.2 |
| 4,908,137 | 3/1990 | Chen | 210/679 |
| 4,937,000 | 6/1990 | Bomer | 210/656 |
| 5,135,650 | 8/1992 | Hjerten | 210/198.2 |

FOREIGN PATENT DOCUMENTS

| | | | |
|---|---|---|---|
| 6199 | 9/1980 | European Pat. Off. | 210/198.2 |
| 337144 | 3/1989 | European Pat. Off. | 210/198.2 |
| 425848 | 5/1991 | European Pat. Off. | 210/198.2 |
| 467339 | 7/1991 | European Pat. Off. | 210/198.2 |
| 2631849 | 12/1989 | France | 210/198.2 |
| 1814598 | 12/1968 | Germany | 210/198.2 |
| 468814 | 3/1993 | Sweden | 210/198.2 |

OTHER PUBLICATIONS

Derwent Abstract of Japan Patent 62 267 663 vol. 12 No. 147 (P–698) May 1988.
Derwent Abstract of Japan Patent 93–285445 Aug. 10, 1993.
Derwent Abstract of Japan Patent 86–086136.

*Primary Examiner*—Ernest G. Therkorn
*Attorney, Agent, or Firm*—Millen, White, Zelano, & Branigan, P.C.

[57] ABSTRACT

The invention relates to an improved method for gel permeation chromatography and to support materials for this method based on hydroxyl-containing base supports onto whose surfaces polymers are covalently bonded, wherein a) the base support comprises aliphatic hydroxyl groups,
b) the covalently bonded polymers are bonded to the support via a terminal monomer unit,
c) the linear polymers comprise monomer units of formula II,
d) the polymers are crosslinked by ether bridges

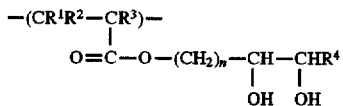

II in which $R^1$, $R^2$ and $R^3$ independently of one another are H or $CH_3$,
$R^4$ is H or $C_1$–$C_5$-alkyl and
n is an integer between 1 and 5.

8 Claims, No Drawings

METHOD AND SUPPORTS FOR GEL PERMEATION CHROMATOGRAPHY

The invention relates to an improved method for gel permeation chromatography and to support materials for this method.

BACKGROUND OF THE INVENTION

Gel permeation chromatography (GPC) for the size separation of macromolecules has become a standard method for the separation of biopolymers, especially proteins. This method requires support materials which possess a hydrophilic surface and which exhibit as little nonspecific adsorption behavior as possible. Furthermore, the supports used are to be pressure-stable in order to achieve high flow rates. This condition is particularly difficult to meet in the case of wide-pored supports.

The application DE 43 10 964 discloses oxirane-containing activated support materials in which monomers of the formula I are grafted onto a hydroxyl-containing base support

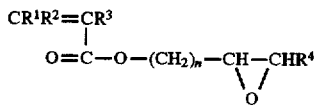

in which $R^1$, $R^2$ and $R^3$ independently of one another are H or $CH_3$,
$R^4$ is H or $C_1$–$C_5$-alkyl and
n is an integer between 1 and 5.

SUMMARY OF THE INVENTION

It has been found that these activated support materials can be reacted to give the crosslinked graft polymers according to the invention. In this reaction, cross-linking takes place onto the known graft polymer, having a linear polymer chain, by reaction, for example, with boron trifluoride etherate; the remaining epoxide groups are subsequently hydrolyzed if desired.

It was found that the separation properties of Fractogel® TSK HW 65 (S), a porous, vinyl-based copolymer containing aliphatic hydroxyl groups (1 meq of OH/g), were altered considerably if this base material was subjected to graft polymerization with glycidyl methacrylate followed by crosslinking. These measures provide access to gel permeation supports having improved separation properties.

The invention relates to support materials for gel permeation chromatography, based on hydroxyl-containing base supports on whose surfaces polymers are covalently bonded, characterized in that a) the base support comprises aliphatic hydroxyl groups,
b) the covalently bonded polymers are bonded to the support via a terminal monomer unit,
c) the linear polymers comprise monomer units of formula II,
d) the polymers are crosslinked by ether bridges

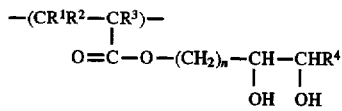

in which $R^1$, $R^2$ and $R^3$ independently of one another are H or $CH_3$,
$R^4$ is H or $C_1$–$C_5$-alkyl and
n is an integer between 1 and 5.

The invention relates to processes for the preparation of support materials based on hydroxyl-containing base supports on whose surfaces polymers are covalently bonded by graft polymerization, characterized in that the hydroxyl-containing base support particles are suspended and polymerized in the presence of cerium(IV) ions in a solution comprising monomers of the formula I

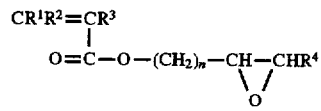

in which $R^1$, $R^2$ and $R^3$ independently of one another are H or $CH_3$
$R^4$ is H or $C_1$–$C_5$-alkyl and
n is an integer between 1 and 5, ether bridges are subsequently produced, and finally the remaining epoxide groups are converted to hydroxyl groups.

The invention relates to the use of a support material according to the invention for gel permeation chromatography, and to methods of separating at least two substances in a mixture by means of gel permeation chromatography using a support material according to the invention.

Base supports in the context of the present invention are particles onto which polymers are grafted. Base supports which can be employed are, in general, customary porous or nonporous support particles, provided they have primary or secondary aliphatic hydroxyl groups at their surface or can have aliphatic hydroxyl groups introduced into them by processes which are known per se. Particularly suitable base supports are polyvinyl alcohol-based polymers, or copolymers of (meth)acrylate derivatives and comonomers containing aliphatic hydroxyl groups, or diol-modified silica gels or polyvinyl-based copolymers containing aliphatic hydroxyl groups. Such base supports are obtainable commercially; one example is Fractogel® TKS HW 65 (S) (from E. Merck), a porous vinyl-based copolymer containing aliphatic hydroxyl groups (1 meq of OH/g).

It has surprisingly been found that (meth)acrylic esters containing an oxirane group can be grafted onto base supports comprising aliphatic hydroxyl groups on their surface. In this context, the polymerization is initiated in accordance with the invention using cerium(IV) ions: G. Mino and S. Kaizerman (1958) J. Polymer Science 31, 242–243; G. Mino et al. (1959) J. Polymer Science 38, 393–401. The activated support materials obtainable by this method can be reacted further, in accordance with the invention, to give the crosslinked separation materials for gel permeation chromatography.

The graft polymerization of Mino and Kaizerman is carried out according to known processes in a purely aqueous solution acidified with nitric acid. Consequently, this reaction can only be carried out using readily water-soluble monomers. It has however been found, surprisingly, that the reaction with cerium(IV) salts is also possible if the solvent used is a mixture of water and organic solvents containing no hydroxyl groups. Particularly preferred solvents in this context are dioxane and tetrahydrofuran. The proportion of organic solvent in the reaction mixture is preferably 10–80% by volume, particularly preferably 20–50% by volume.

In contrast to macroporous materials based on known, crosslinked dextran or agarose gels, the gels according to the invention are pressure-stable and permit high flow rates.

Even without further comments it is assumed that a person skilled in the art will be able to utilize the above description in the widest context. The preferred embodiments are, consequently, to be interpreted merely as descriptive and in no way as a disclosure which is in any sense limiting.

The complete disclosure of all applications, patents and publications mentioned above and below, and the corresponding application DE 43 34 353, filed on 8 Oct. 1993, are incorporated in this application by reference.

The examples which follow are intended to illustrate the invention in more detail, and place no restriction on the invention.

EXAMPLES

In the Preparation Examples below, room temperature (RT) is 15°–30° C. Polymerization is carried out in a three-necked flask of appropriate size which is fitted with stirrer, dropping funnel and thermometer. Washing takes place by filtration with suction on a suction filter.

Example 1

Preparation of an oxirane-activated support starting from Fractogel®- TSK HW 65 (S)

With 4 g of ammonium cerium(IV) nitrate (dissolved in 50 ml of 2M HNO₃) there are mixed with vigorous stirring at room temperature a suspension of 100 ml of sedimented Fractogel®-TSK HW 65 (S) and 50 ml of water. After 1 minute, a solution of 6 g of 2,3-epoxypropyl methacrylate in 60 ml of dioxane is added. Stirring is continued for 3 hours. The reaction suspension is subsequently washed, first with distilled water and then with 0.05M EDTA solution.

Example 2

Crosslinking of the poly-2,3-epoxypropyl methacrylate chain

The modified gel from Example 1 is dewatered by washing with 200 ml each of 25, 50 and 75% by volume aqueous dioxane, and is finally washed with 200 ml of pure dioxane. For the subsequent reaction, the gel is suspended in 100 ml of dried dioxane and the suspension is transferred to a three-necked flask. 25 ml of boron trifluoride etherate were added with stirring, in the absence of air, and stirring was continued at room temperature for one hour. The gel was then filtered off and washed with 200 ml each of dioxane, acetone and water.

Finally, the unreacted oxirane groups are hydrolyzed by treatment with 200 ml of 0.5M sulfuric acid (2 hours, 45° C.). The material is then washed to neutrality with phosphate buffer (0.1M; pH 7) and, finally, washed with water.

The performance example which follows demonstrates the action of the separating materials modified in accordance with the invention.

Example 3

Comparison of the modified separation material with the unmodified starting product One of two glass chromatography tubes (length 30 cm, internal diameter 10 mm; SuperFormance® from E. Merck) is filled with unmodified Fractogel®-TSK HW 65 (S) separating material and the other with separating material modified in accordance with Example 2. Various calibration proteins and dextran blue are dissolved in 0.15M NaCl in 20 mM phosphate buffer, pH 7, and are eluted on both columns at a flow rate of 1 ml/min. The following elution data are found:

| Analyte | Molecular weight | Elution after minutes | |
|---|---|---|---|
| | | modified | unmodified |
| Dextran blue | 2,000,000 | 15.9 | 8.5 |
| Thyreoglobin | 660,000 | 14.9 | 8.55 |
| Bovine serum albumin | 67,000 | 16.0 | 16.6 |
| Myoglobin | 12,000 | 16.3 | 17.0 |

It is found that the elution characteristics of analytes having a high molecular weight (dextran blue and thyreoglobin) are markedly altered, which is not the case with proteins of moderate or low molecular weight (bovine serum albumin and myoglobin).

I claim:

1. A support material for gel permeation chromatography, comprising a hydroxyl-containing base support on the surface of which polymers are covalently bonded, wherein:
   a) the base support comprises aliphatic hydroxyl groups,
   b) the covalently bonded polymers are bonded to the support via a terminal monomer unit,
   c) the polymer comprise monomer units of formula II,

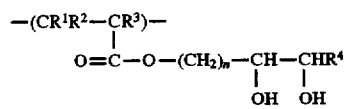

in which
R¹, R² and R³ independently of one another are H or CH₃
R⁴ is H or C₁–C₅-alkyl and
n is an integer between 1 and 5, and
   d) the polymers are crosslinked by ether bridges.

2. The support material of claim 1, wherein the hydroxyl-containing base support is a polyvinyl alcohol polymer, a copolymer of (meth)acrylate with comonomers containing aliphatic hydroxyl groups, a diol-modified silica gel or a polyvinyl copolymer containing aliphatic hydroxyl groups.

3. A method of separating at least two substances in a mixture by means of gel permeation chromatography with a support material according to claim 1.

4. A process for the preparation of a support material comprising a hydroxyl-containing base support on the surface of which polymers are covalently bonded by graft polymerization, which process comprises polymerizing monomers of the formula I in solution in the presence of suspended particles of the hydroxyl-containing base support and cerium(IV) ions

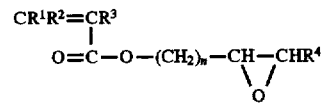

in which
R¹, R² and R³ independently of one another are H or CH₃,
R⁴ is H or C₁–C₅-alkyl and
n is an integer between 1 and 5;
crosslinking the polymers by producing ether bridges therebetween; and converting the remaining epoxide groups to hydroxyl groups.

5. The method of claim 4, wherein the crosslinking is effected by reaction with boron trifluoride etherate.

6. The method of claim 4, wherein the polymerizing of the monomer is conducted in the presence of a solvent which is a mixture of water and an organic solvent containing no hydroxyl groups.

7. The method of claim 6, wherein the organic solvent is dioxane or tetrahydrofuran.

8. The method of claim 6, wherein the proportion of the organic solvent in the reaction mixture is 10–80% by volume.

* * * * *